United States Patent [19]
Ells et al.

[11] 3,992,924
[45] Nov. 23, 1976

[54] UNDERWATER PIPELINES
[75] Inventors: John William Ells, Bexleyheath; Arthur Roberts, Ashford, both of England
[73] Assignee: The British Petroleum Company Limited, London, England
[22] Filed: Dec. 1, 1975
[21] Appl. No.: 636,654

Related U.S. Application Data
[63] Continuation-in-part of Ser. No. 539,921, Jan. 19, 1975, which is a continuation-in-part of Ser. No. 420,003, Nov. 29, 1973, abandoned.

[52] U.S. Cl. .............................................. 73/40.5 A
[51] Int. Cl.² .......................................... G01M 3/24
[58] Field of Search ....... 73/40.5 A, 40.5 R, 67.7 R, 73/67.8 R, 19; 340/242

[56] References Cited
UNITED STATES PATENTS

| | | | |
|---|---|---|---|
| 2,997,689 | 8/1961 | Johnson et al. ............... | 73/67.7 R X |
| 3,222,635 | 12/1965 | Simpkins et al. ................ | 73/40.5 A |
| 3,261,200 | 7/1966 | Long ............................... | 73/40.5 A |
| 3,289,465 | 12/1966 | Parker ............................ | 73/40.5 A |
| 3,409,897 | 11/1968 | Bosselaar et al. ............ | 73/40.5 A X |
| 3,622,958 | 11/1971 | Tucker et al. ..................... | 73/19 X |

Primary Examiner—Richard C. Queisser
Assistant Examiner—Joseph W. Roskos
Attorney, Agent, or Firm—Morgan, Finnegan, Pine, Foley & Lee

[57] ABSTRACT

A leak in an underwater liquid filled pipeline is located by moving a receiver capable of detecting ultrasonic energy of frequency in the range 20 to 70 kilohertz along a path parallel to the axis of the pipeline at a distance of 100 to 2000 feet from the axis of the pipeline measured in a horizontal plane. The receiver noise generated by liquid escaping from a leak is detected with the receiver.

4 Claims, 3 Drawing Figures

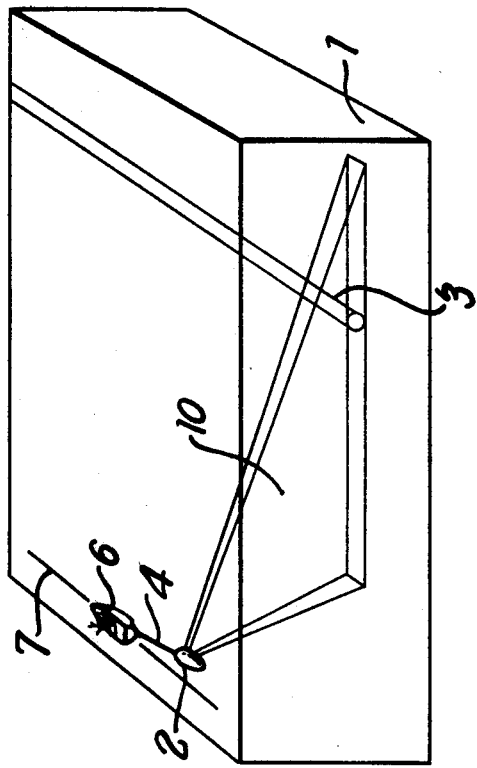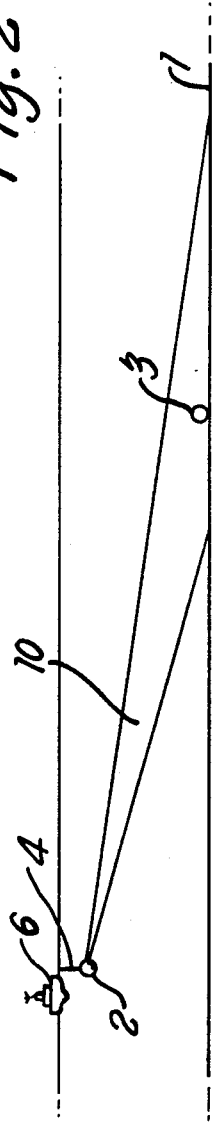

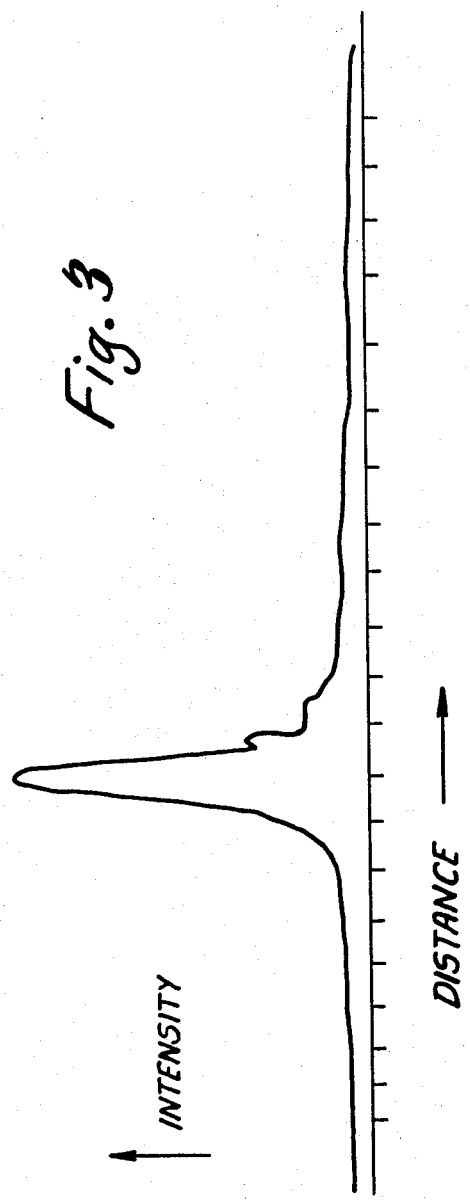

UNDERWATER PIPELINES

This application is a continuation-in-part application of our application Ser. No. 539,921, filed Jan. 19, 1975, which is a continuation-in-part of our application Ser. No. 420,003, filed Nov. 29, 1973, now abandoned.

This invention relates to a method of testing an underwater pipeline carrying liquid at a greater than ambient pressure to detect whether any leak is present and to locate said leak.

In recent years, underwater pipelines for the transmission of oil and gas have been increasingly employed. It is important that these pipelines should not leak in service since the economic consequences and pollution can be very serious.

A method which has been previously used for detecting a leak in a pipeline before commissioning involves filling the pipeline with water under high pressure and detecting any fall in pressure. A fall in pressure will mean that a leak is present but this method does not reveal where the leak is located. There may then follow a time consuming survey of the line by divers.

There is accordingly a need for an improved method of detecting leaks in underwater pipelines and it is an object of the present invention to provide such a method.

According to the present invention a method of testing an underwater pipeline carrying liquid at a greater than ambient pressure to detect whether a leak is present and to locate said leak comprises:

a. moving a directional receiver capable of detecting ultrasonic energy only within an arc of 10° measured in a horizontal plane and sensitive to frequencies in the range 20 to 70 kilohertz externally of the pipeline along a path up to 5,000 feet from the axis of the pipeline (measured in a horizontal plane), and b. correlating the speed of movement of the receiver and the distance of the receiver from the axis of the pipeline to detect with the receiver any ultrasonic energy in the frequency 20 to 70 kilohertz generated by liquid escaping from a leak and thereby locate said leak.

Within the range 20 to 70 kilohertz the intensity of the energy due to a leak is greater than the background acoustic energy. Outside this range the background acoustic energy can mask that due to a leak.

When the water depth in which the pipelines lies is greater than 200 feet it is preferred that the receiver is moved along a path within the range 20 to 120 feet, more preferably 50 to 100 feet of the water bottom since the sensitivity of the method is sometimes adversely affected by temperature gradients in the water.

The liquid in the pipeline can be oil or water.

Preferably the pressure of liquid inside the pipeline is in the range 200 to 5,000 psi preferably 1000 to 3000 psi above ambient.

The receiver can be conveniently towed by a ship or attached to the hull of a ship. Alternatively it can be towed on a submersible craft of the type used for pipeline inspection.

The receiver can be a hydrophone or transducer, preferably the latter. The hydrophone or transducer will detect the acoustic energy generated by the leak and convert the acoustic energy into an electrical output which can be amplified and presented or recorded by known means in visual or audible form to indicate the presence of a leak.

Preferably the electrical output is recorded on a chart or photographic recorder to provide a permanent record for inspection.

A hydrophone or transducer usually detects acoustic energy arriving from a wide range of directions and will be sensitive to background acoustic energy which may make it difficult to distinguish the acoustic energy produced by the leak in the pipeline. It is, therefore, preferred to use a directional hydrophone or transducer which is sensitive only to energy coming approximately from the direction of the pipeline. The theory and construction of directional receivers is well known. Preferably the receiver is capable of receiving ultrasonic energy mainly within an arc of 10° measured in a horizontal plane, more preferably an arc of 2° and within an arc of 20° measured in a vertical plane, more preferably an arc of 10°.

Suitable receivers are commercially available and have been described in the British Journal of Applied Physics, Vol. 12, March 1961 at pages 103–110 and in Kelvin Hughes Publication KH 451 entitled "Towed Surveying Asdic".

If the sensitivity range of the receiver is too wide there is a risk of extraneous acoustic energy being detected, if too narrow, then a risk of missing the leak.

Whilst the invention can be employed for detecting and locating a leak it can be conveniently employed as a routine testing procedure for an underwater oil carrying pipeline when there is no special reason to suspect the presence of a leak. It can also be employed to test water filled lines prior to commissioning. Also if a leak is already known to be present it can be used to locate said leak.

The receiver can conveniently be enclosed in a hollow shell known in the art as a "fish" and the fish can be towed at the required depth from a ship by means of a cable.

Preferably the path is approximately parallel to the axis of the pipeline and preferably the path is from 200 to 1000 feet from the axis of the pipeline.

If the speed of movement is too great there is a risk of missing the leak. There is no lower limit on the speed of movement but clearly the lower speed the longer it will take to detect the leak. Preferably the speed of movement is less than 12 knots, more preferably from ½ to 10 knots.

An example of the invention is illustrated by the accompanying drawings in which FIG. 1 is a perspective view showing a ship towing a receiver.

FIG. 2 is a side elevation showing the energy received by the receiver, and

FIG. 3 shows a paper recording obtained.

A pipeline 3 having an internal diameter of 7 inches and lying on the sea bed 1 under 135 feet of water was filled with water and a pressure of 1,800 psi applied.

A receiver of ultrasonic energy in the form of a Kelvin Hughes magnetostrictive transducer enclosed in a fish 2 was towed by means of a cable 4 from a ship 6 along a path parallel to the axis of the pipeline at a height of 120 feet above the sea bed at a speed of 4 knots. The receiver was of the directional type capable of receiving energy mainly within a cone 10 measuring 2° in the horizontal plane and 10° in the vertical plane. The path was 250 feet to the left hand side of the pipeline measured in a horizontal plane. The transducer was capable of detecting acoustic energy of frequency 50 kilohertz ± 5%. A leak was detected and its position located by a trace on a recording as shown in FIG. 3.

We claim:
1. A method of testing an underwater pipeline carrying liquid in a greater than ambient pressure to detect whether a leak is present and to locate said leak comprising:
   a. moving a directional receiver capable of detecting ultrasonic energy within an arc of 10° measured in a horizontal plane and sensitive to frequencies in the range 20 to 70 kilohertz externally of the pipeline along a path up to 5,000 feet from the axis of the pipeline (measured in a horizontal plane), and
   b. correlating the speed of movement of the receiver, and the distance of the receiver from the axis of the pipeline to detect with the receiver any ultrasonic energy in the frequency 20 to 70 kilohertz generated by liquid escaping from a leak and thereby locate said leak.

2. A method as claimed in claim 1 wherein the pressure of liquid inside the pipeline is in the range 200 to 5,000 psi above ambient.

3. A method as claimed in claim 1 wherein the receiver is moved at a speed of from ½ to 10 knots and the path is substantially parallel to the axis of the pipeline.

4. A method as claimed in claim 1 wherein when the water depth in which the pipeline lies is over 200 feet, the receiver is moved along a path within the range of 20 to 120 feet of the water bottom.

* * * * *

UNITED STATES PATENT AND TRADEMARK OFFICE
CERTIFICATE OF CORRECTION

PATENT NO. : 3,992,924
DATED : November 23, 1976
INVENTOR(S) : John William Ells and Arthur Roberts It is certified that error appears in the above—identified patent and that said Letters Patent are hereby corrected as shown below:

In Claim 1, Column 3, Line 10, after the word "energy", insert --mainly--.

Signed and Sealed this

Twenty-ninth Day of March 1977

[SEAL]

Attest:

RUTH C. MASON
Attesting Officer

C. MARSHALL DANN
Commissioner of Patents and Trademarks